United States Patent
Chun

(10) Patent No.: US 7,193,976 B2
(45) Date of Patent: Mar. 20, 2007

(54) WIRELESS COMMUNICATION APPARATUS AND METHOD FOR COMPENSATING OFFSET USING THE SAME

(75) Inventor: Phil-Seong Chun, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 1028 days.

(21) Appl. No.: 10/247,814

(22) Filed: Sep. 20, 2002

(65) Prior Publication Data

US 2003/0128741 A1    Jul. 10, 2003

(30) Foreign Application Priority Data

Sep. 22, 2001    (KR) ............................ 2001-58882

(51) Int. Cl.
*G08C 17/00*    (2006.01)
(52) U.S. Cl. .................. 370/311; 455/522; 455/574; 370/318
(58) Field of Classification Search ............. 370/310, 370/311, 318, 328, 329, 332, 341, 2, 342, 370/343, 503, 515, 516; 455/522, 574

See application file for complete search history.

(56) References Cited

U.S. PATENT DOCUMENTS

| 6,212,176 B1 * | 4/2001 | Andersson et al. .......... 370/347 |
| 6,252,868 B1 * | 6/2001 | Diachina et al. ............ 370/347 |
| 6,782,250 B2 * | 8/2004 | Rainish et al. ........... 455/343.2 |

* cited by examiner

*Primary Examiner*—Ajit Patel
(74) *Attorney, Agent, or Firm*—Sughrue Mion, PLLC

(57) ABSTRACT

A wireless communication apparatus and a method for compensating offset using the same are disclosed, in which offset due to latency in a power save mode is efficiently compensated. The wireless communication apparatus includes a frequency matched unit for compensating offset due to latency that may occur during communication between the wireless communication apparatus and an external equipment. The frequency matched unit adds a clock value corresponding to predetermined frames to a clock value of a system clock if any one of a hold mode, a sniff mode, or a park mode is transited to a normal mode. Thus, the offset generated in the frames can efficiently be compensated if the hold mode, the sniff mode or the park mode is transited to the normal mode.

12 Claims, 7 Drawing Sheets

A

B

WIRELESS COMMUNICATION APPARATUS AND METHOD FOR COMPENSATING OFFSET USING THE SAME

BACKGROUND OF THE INVENTION

1. Field of the Invention

The present invention relates to a wireless communication apparatus and a method for compensating offset using the same, and more particularly, to a wireless communication apparatus and a method for compensating offset using the same in which latency generated in a power save mode can efficiently be compensated. The present application is based on Korean Application No. 2001-58882, filed Sep. 22, 2001, which is incorporated herein by reference.

2. Description of the Related Art

Bluetooth is a name for a wireless data communication technology in the field of electrical communication, networking, computing, and consumer goods. The Bluetooth technology serves to connect various apparatuses through one wireless connection operating over a short distance. For example, if the Bluetooth wireless communication technology is implemented in cellular phones and laptop computers, the cellular phones and laptop computers can communicate among themselves without cables. All digital equipment as well as printers, personal digital assistants (PDA), desk top computers, facsimiles, keyboards, and joy sticks may be a part of the Bluetooth system.

Generally, the Bluetooth system has a maximum data transmission of 1 Mbps and a maximum transmission distance of 10 m. 1 Mbps is a frequency within an industrial scientific medical (ISM) frequency band of 2.4 GHz that can be used without any permission, and can readily be realized at a low cost. Also, the transmission distance of 10 m has been established because it is a sufficient transmission distance between a user's portable equipment and a personal computer on a desk in an office.

Furthermore, since the Bluetooth system has been devised to operate in the radio frequency environment where a lot of noise exists, a frequency hopping system of 1600 times per second is used to provide stable data transmission and reception in such a radio frequency environment having a lot of noise.

Moreover, the Bluetooth system supports one-to-multiple connection as well as one-to-one connection. As shown in FIG. 1, in the Bluetooth system, a plurality of piconets can be constructed and connected, respective piconets being divided by different frequency hopping orders. The term "piconet" means a Bluetooth unit formed by connecting one or more slaves to one master device. A piconet can have one master and a maximum of seven slaves. The master equipment and the slave equipment implement bi-directional communication by means of time division duplex (TDD) based on 1 hopping slot of 625 µs (¹⁄₁₆₀₀ second). The plurality of piconets systematically connected with one another constitute a scatternet.

FIG. 2 illustrates communication between the master and the slaves by means of the TDD. Referring to FIG. 2, each channel allocated to time slots has a length of 625 µs. The number of time slots is determined by a Bluetooth clock of the piconet master. Also, the master and the salve can alternatively transmit packets. That is, the master transmits packets in only the time slot marked by an even number. The slave transmits packets in only the time slot marked by an odd number. The packets transmitted by the master or the slave should be provided within five time slots. A packet is a unit of data transmitted on a piconet channel.

The piconet is synchronized with the system clock of the master. The system clock of the master is never corrected as long as the piconet exists. The system clock of the master is maintained in a period of M×625 µs during successive transmissions, where M is an even number and a positive integer.

The slave updates timing offset to match with the master clock. That is to say, the slave compares a test RX timing with an exact RX timing of a received packet so as to update offset for compensating a timing error.

The slave TX timing should be based on the latest slave RX timing. The RX timing is based on the last successive trigger during a slot from the master to the slave. The slave can receive a packet and can correct the RX timing as long as timing inconsistency remains in a window of uncertainty of ±10 µs.

When the Bluetooth system is connected, the master can manage the slave in a hold mode, a sniff mode, a park mode, and so on, in order to save power. The hold mode retains an active member address AM_ADDR in a state where the master is connected with the slave, and proceeds into a sleep state. The sniff mode retains an active member address AM_ADDR in a state where the master is connected with the slave, and extends a listen interval. The park mode proceeds into a sleep state by opening an active member address AM_ADDR in a state where the master is connected with the slave. Before the slave proceeds into the park mode, a park mode address PM_ADDR or an access request address AR_ADDR is assigned from the master.

FIG. 3 illustrates an RX/TX cycle of a Bluetooth master in a normal mode for a single slot packet, and FIG. 4 illustrates an RX/TX cycle of a Bluetooth slave in a normal mode for a single slot packet. As shown in FIGS. 3 and 4, the Bluetooth system selectively transmits and receives a packet in a state where the master is connected with the slave. The maximum size of the packet may be 366 µs depending on the type of packet and the load length. The RX transmission and the TX transmission have different hopping frequencies. The channel hopping frequency is denoted by g(m).

Once the transmission is implemented, the return packet is estimated as N×625 µs after a TX burst starts, wherein N is an odd number and a positive integer. Also, N depends on the type of the transmitted packet. The window has a length of 20 µs during normal operation, which assures latency of +/−10 µs.

If the master of the Bluetooth system is transited to an active state in a state where it manages the slave in a hold mode, a sniff mode, or a park mode, offset may occur between the master and the slave. That is, latency of +/−10 µs is assured while the Bluetooth system is connected. If such latency is accumulated in a power save mode for a long time (>40 sec.), the Bluetooth system, which employs a frequency hopping spread spectrum (FHSS), fails to transmit data even under the connection state. Referring to FIG. 5, the Bluetooth system may be in a hold mode under the connection state. In the hold mode, the Bluetooth system neither transmits nor receives data. If the slave of the Bluetooth system is returned to a normal mode, the slave should check, before transmitting data to the master, whether there has been any request signal from the master. In this case, the size of a search window of the slave can increase from +/−10 µs to Xµs as shown.

If the size of the search window exceeds 625 µs, the following window starts not at the RX hopping frequency g(2 m), g(2 m+2), . . . ,g(2 m+2i) (where, i is an integer) but at g(2 m), g(2 m+4), . . . , g(2 m+4i). Alternatively, the following window starts at g(2 m), g(2 m+6), . . . , g(2 m+6i). In this case, a problem arises in that inconsistency of the hopping frequency is caused, thereby exceeding a limited time of 40 sec.

To prevent such a problem from occurring, an experimental estimated value, derived from many experiments, should be provided. In this case, however, power conservation features may be lost. Also, if a hold mode of 40.9 sec. is used, the maximum latency of 32.750 ms should be compensated, thereby exceeding 625 µs.

SUMMARY OF THE INVENTION

Accordingly, it is a primary object of the present invention to provide a wireless communication apparatus and a method for compensating offset using the same in which a window size of a microsecond unit is enlarged in a frame unit to more efficiently compensate latency.

In order to achieve the above-described objects of the present invention, there is provided a wireless communication apparatus which includes a transceiver for transmitting and receiving data packets to and from an external equipment; and a frequency matched unit for compensating an offset due to latency that may occur during communication between the wireless communication apparatus and the external equipment by adding a clock value corresponding to predetermined frames to a clock value of a system clock if any one of a hold mode, a sniff mode, or a park mode is transited to a normal mode.

The frequency matched unit includes a hopping frequency calculator for calculating a hopping frequency of the frames from the added value; an access code searcher for searching an access code provided in the data packets; a counter for counting the number of the frames; and a controller for compensating a frequency of the frames to the hopping frequency so that the offset is compensated. The controller controls the hopping frequency calculator, the access code searcher, and the counter, so that the offset is compensated if the access code is searched. The controller also determines whether the frames have been ended if the access code is not searched, counts the frames if it is determined that the frames have not been ended, and controls the counter and the access code searcher to search the access code. Also, the controller obtains the clock value corresponding to the frames from the number of the frames counted by the counter, one frame in the frames having a length of 1.25 ms which is one frame length in an FHSS system.

In the wireless communication apparatus according to the present invention, since a window size of a microsecond unit is enlarged in a frame unit, latency can be compensated more efficiently.

There is also provided a wireless communicating method including the steps of transmitting and receiving data packets to and from an external equipment; and compensating offset due to latency that may occur during communication between a wireless communication apparatus and the external equipment by adding a clock value corresponding to predetermined frames to a clock value of a system clock if any one of a hold mode, a sniff mode, or a park mode is transited to a normal mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A wireless communication apparatus and a method for compensating offset using the same in accordance with preferred embodiments of the present invention will now be described in detail with reference to the accompanying drawings.

Figure 1:
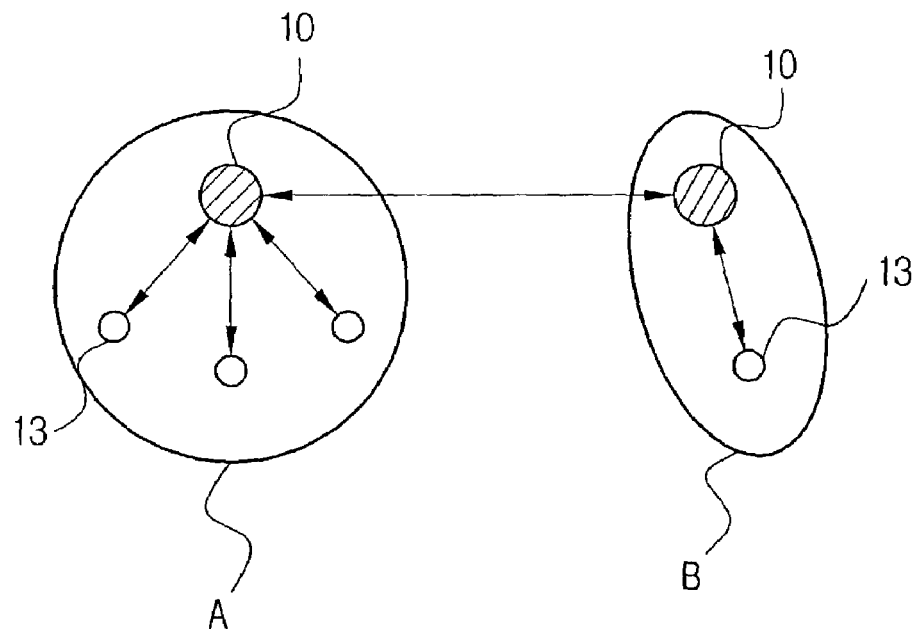
FIG. 1 illustrates a scatternet of a Bluetooth system.
Figure 2:
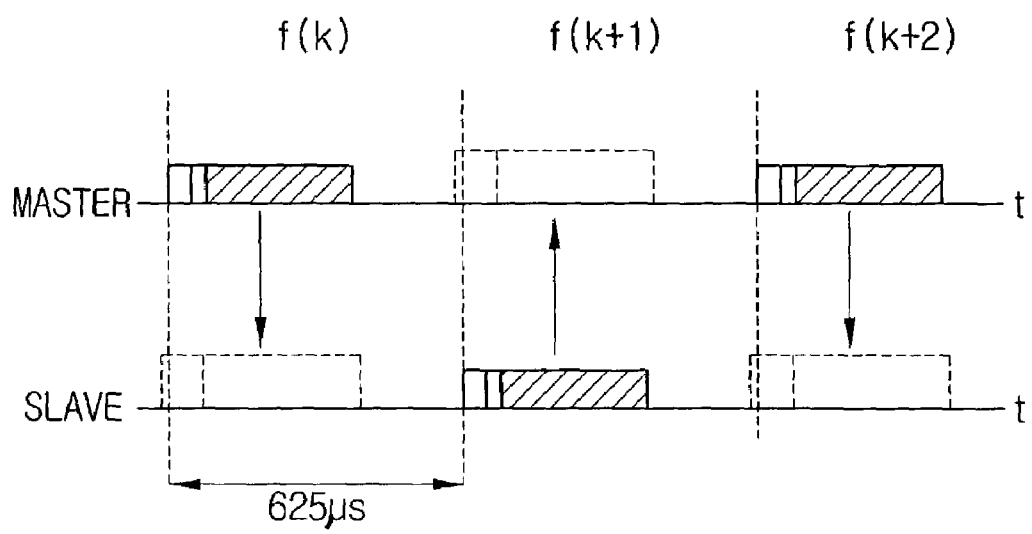
FIG. 2 illustrates communication between a master and a slave by means of a TDD.
Figure 3:
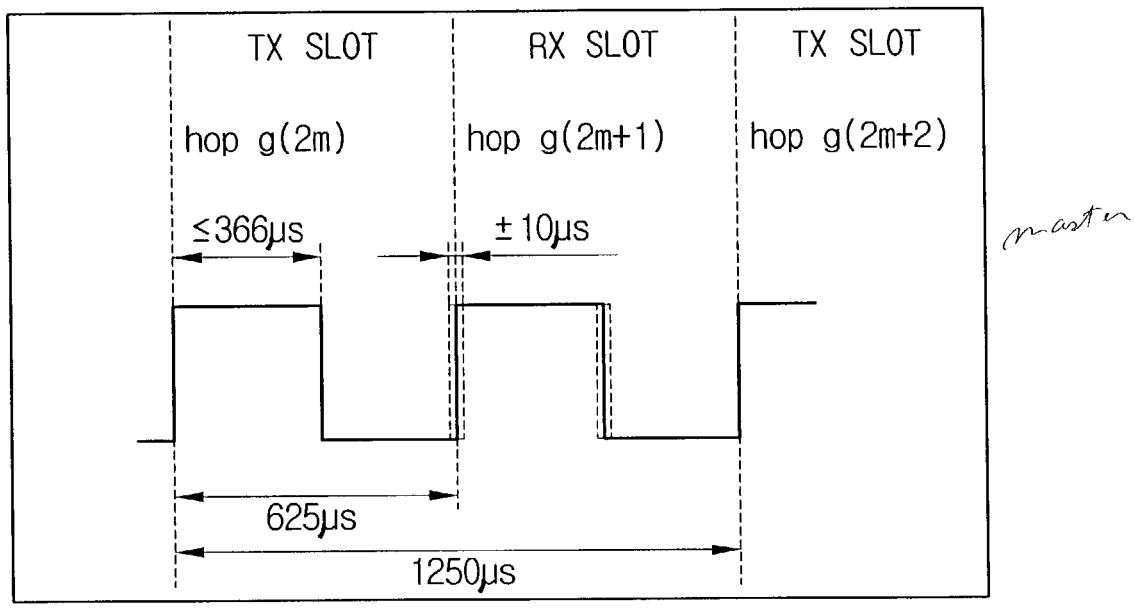
FIG. 3 illustrates an RX/TX cycle of a Bluetooth master in a normal mode for a single slot packet.
Figure 4:
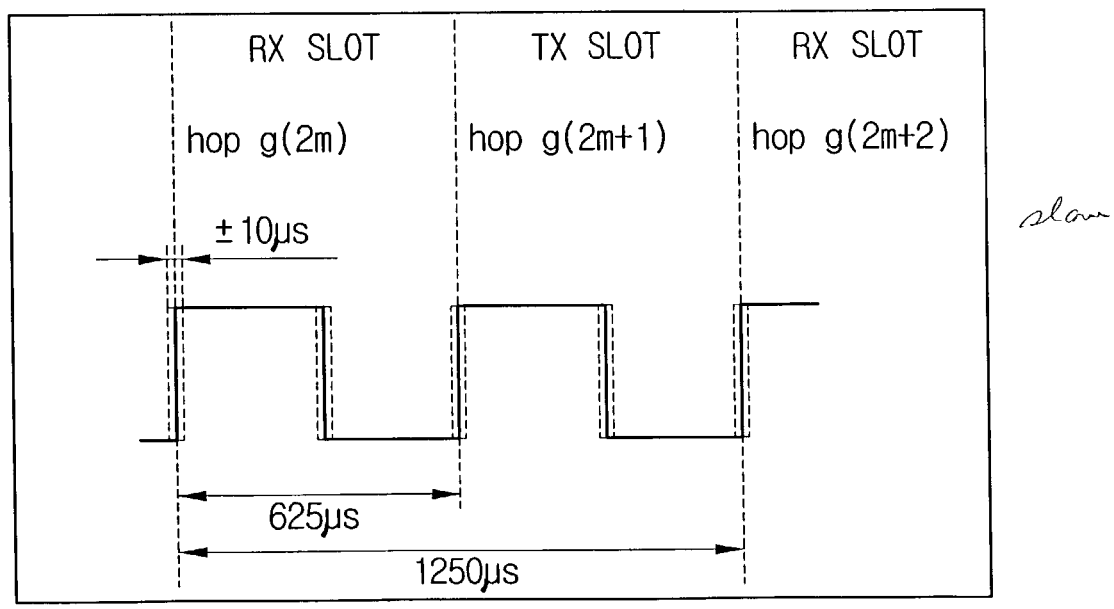
FIG. 4 illustrates an RX/TX cycle of a Bluetooth slave in a normal mode for a single slot packet.
Figure 5:
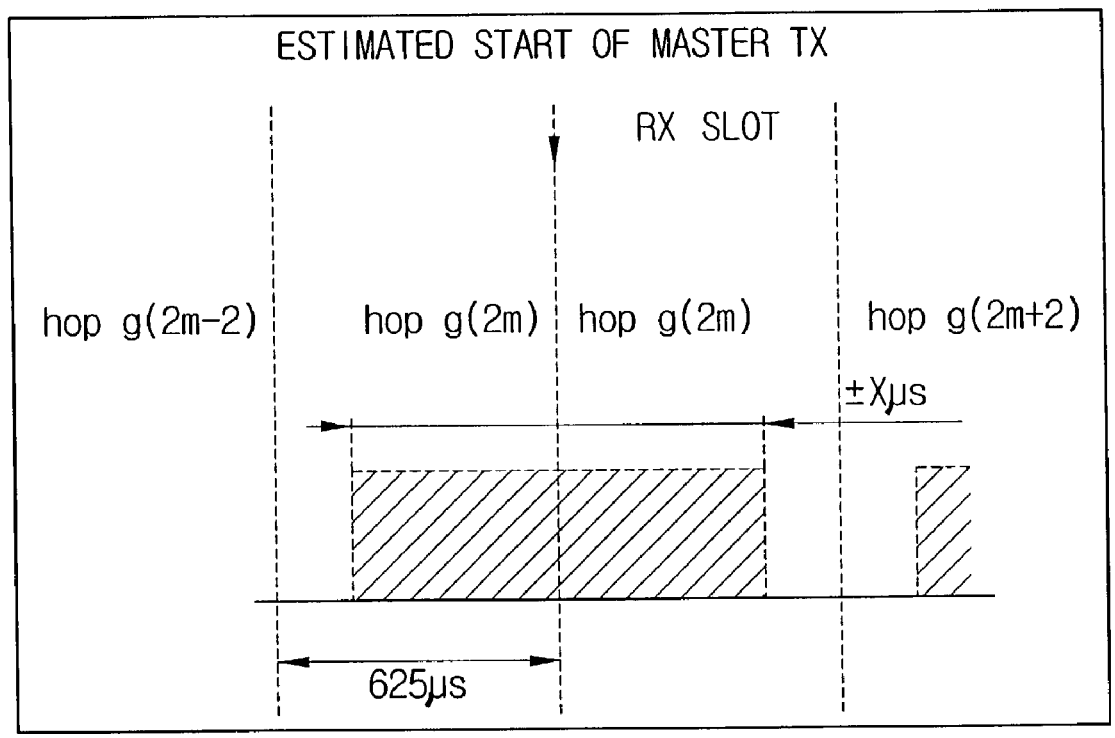
FIG. 5 illustrates an RX timing of a slave if it is returned from a hold state.
Figure 6:
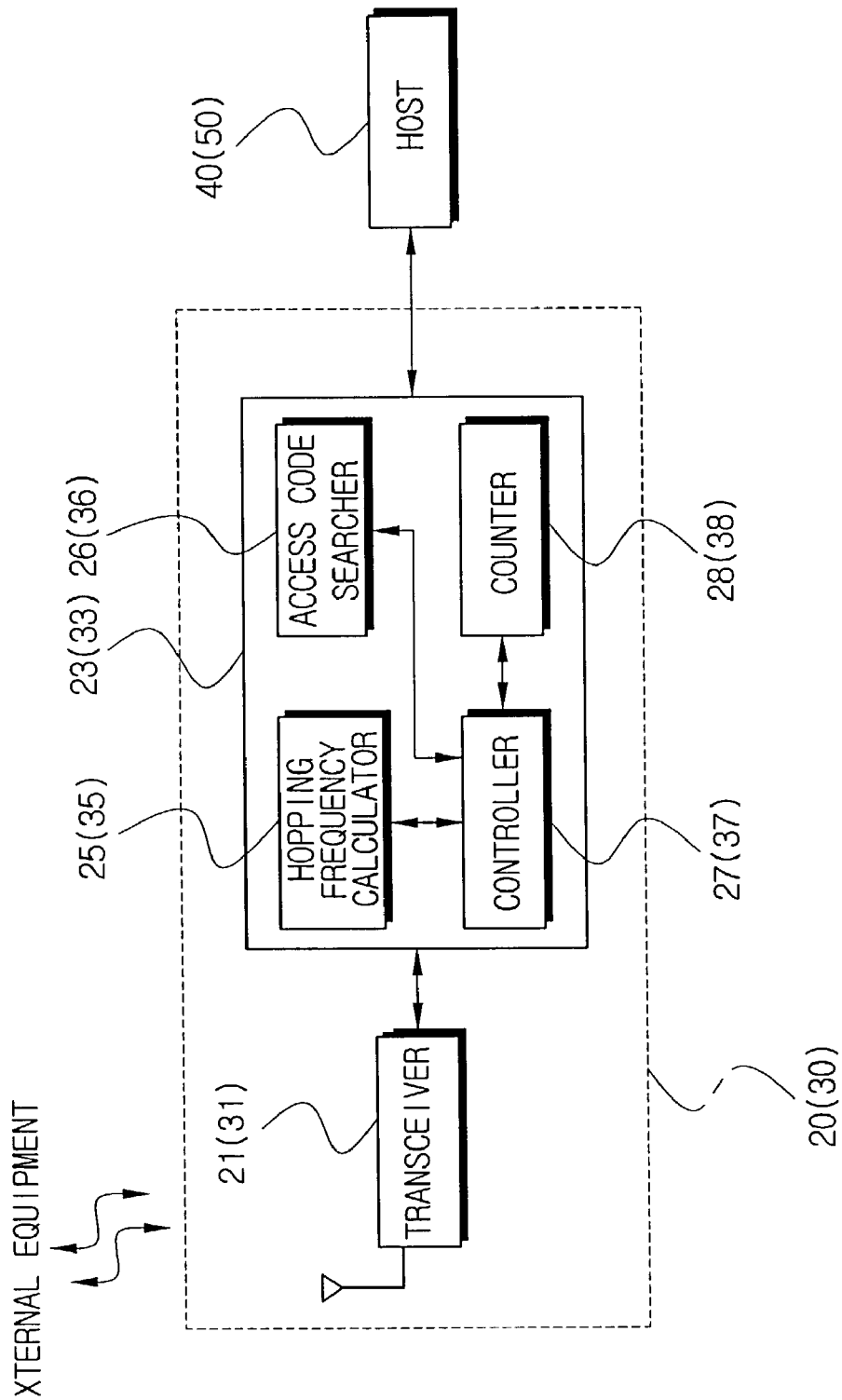
FIG. 6 is a block diagram illustrating a wireless communication apparatus according to the present invention.

FIG. 6 is a block diagram illustrating a wireless communication apparatus according to the present invention.

Referring to FIG. 6, a wireless communication apparatus 20(30) according to the present invention includes a transceiver 21(31) and a frequency matched unit 23(33). The frequency matched unit 23(33) includes a hopping frequency calculator 25(35), an access code searcher 26(36), a controller 27(37), and a counter 28(38). There is provided a host 40(50) as a peripheral element of the wireless communication apparatus 20(30). The reference numerals 20, 21, 23, 25, 26, 27, 28, and 40 represent the wireless communication apparatus and its elements operated by slaves while the reference numerals 30, 31, 33, 35, 36, 37, 38, and 50 represent the wireless communication apparatus and its elements operated by a master.

First, the wireless communication apparatus 20 operated by the slaves will be described.

The transceiver 21 processes an externally received signal, such as a radio frequency (RF) signal and externally transmits data packets to be transmitted.

The frequency matched unit 23 is connected to the host 40 through a communication interface. Various communication terminals such as notebook computers, cellular phones, and printers may be used as the host 40. The frequency matched unit 23 processes a signal requested from the host 40 and also processes a signal received through the transceiver 21. Furthermore, if any one of a hold mode, a sniff mode, and a park mode is transited to a normal mode, the frequency matched unit 23 adds a clock value corresponding to predetermined frames to a clock value of a system clock (not shown) provided in the wireless communication apparatus 20 so that offset due to latency that may occur during communication between the wireless communication apparatus and an external equipment is compensated.

The hopping frequency calculator 25 calculates a frame hopping frequency from a value obtained by adding a clock value corresponding to the frames to the clock value of the system clock in the wireless communication apparatus 20.

The access code searcher 26 searches an access code provided in a data packet. The access code is provided in a data packet transmitted from a piconet channel. The data packet starts with the access code. The access code is used for signal synchronization as well as DC offset compensation and signal identification.

The controller 27 controls the hopping frequency calculator 25, the access code searcher 26, and the counter 28 so that the frame frequency is compensated by the obtained hopping frequency to compensate offset.

The counter 28 counts the number of frames. The number of frames counted by the counter 28 is transmitted to the controller 27. Based on the number of frames received from the counter 28, the controller 27 obtains a clock value corresponding to the frames.

Next, the wireless communication apparatus 30 operated by the master will be described.

When the wireless communication apparatus 30 is operated by the master, it requests any one of the slaves to implement a master function for a predetermined time. The master determines the overall characteristics of a channel within a piconet. A bluetooth device address BD_ADDR of the master determines a frequency hopping row and a channel access code. That is, a clock of the master determines a phase of a hopping row and a timing. Also, the master controls the traffic on a channel. Any of the digital equipment may be used as the master. If a piconet is formed, functions of the master may be reversed to those of the slave.

The frequency matched unit 33 exchanges a data transmission timing with the slave connected to a network, and transmits and processes piconet data including an active member address of the slaves connected to the network.

Figure 7:
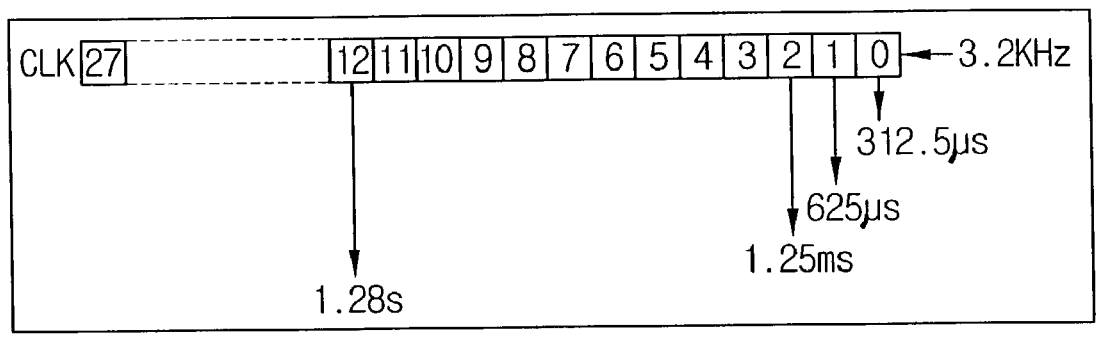
FIG. 7 illustrates a Bluetooth clock.

FIG. 7 illustrates clocks of a Bluetooth system. The Bluetooth system includes an internal system clock (hereinafter, referred to as a Bluetooth clock) that determines hopping and timing of transmission and reception. The Bluetooth clock is neither changed nor controlled. However, mutually synchronized temporary Bluetooth clocks obtained by adding an offset value to the original clock may be provided to synchronize with the other equipment.

The timing and the frequency hopping of the channel on the piconet are determined by the Bluetooth clock of the master. When the piconet is established, the clock of the master communicates with the slaves. Each slave adds an offset value to each slave clock to synchronize with the clock of the master. Since clocks of respective equipment may be differently driven, respective offset values should periodically be updated.

In the Bluetooth system, four periods, 312.5 μs, 625 μs, 1.25 ms, and 1.28 s correspond to timer bits, CLK0, CLK1, CLK2, and CLK12. Transmission from the master to the slaves starts in an even numbered period when CLK0 and CLK1 are all 0.

Figure 8:
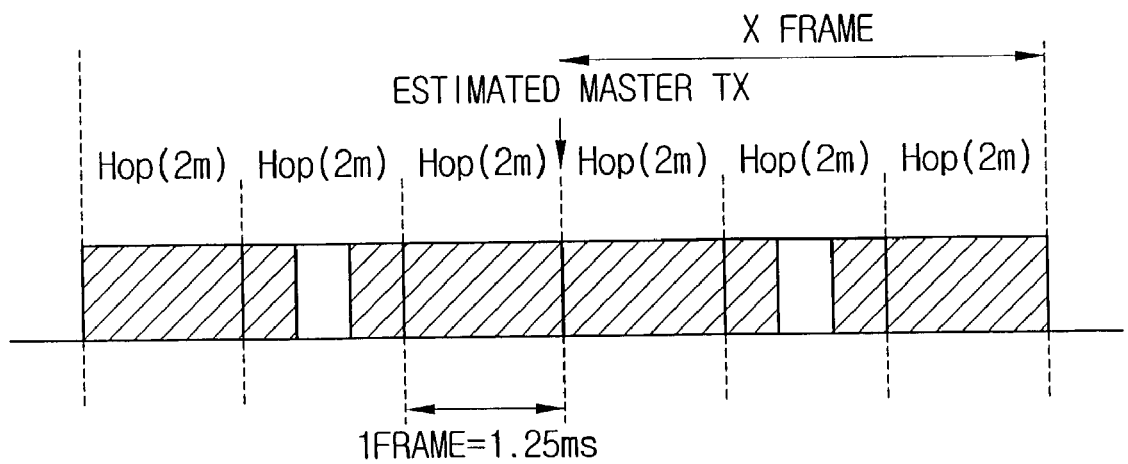
FIG. 8 illustrates a window size enlarged in a frame unit of FIG. 6.
Figure 9:
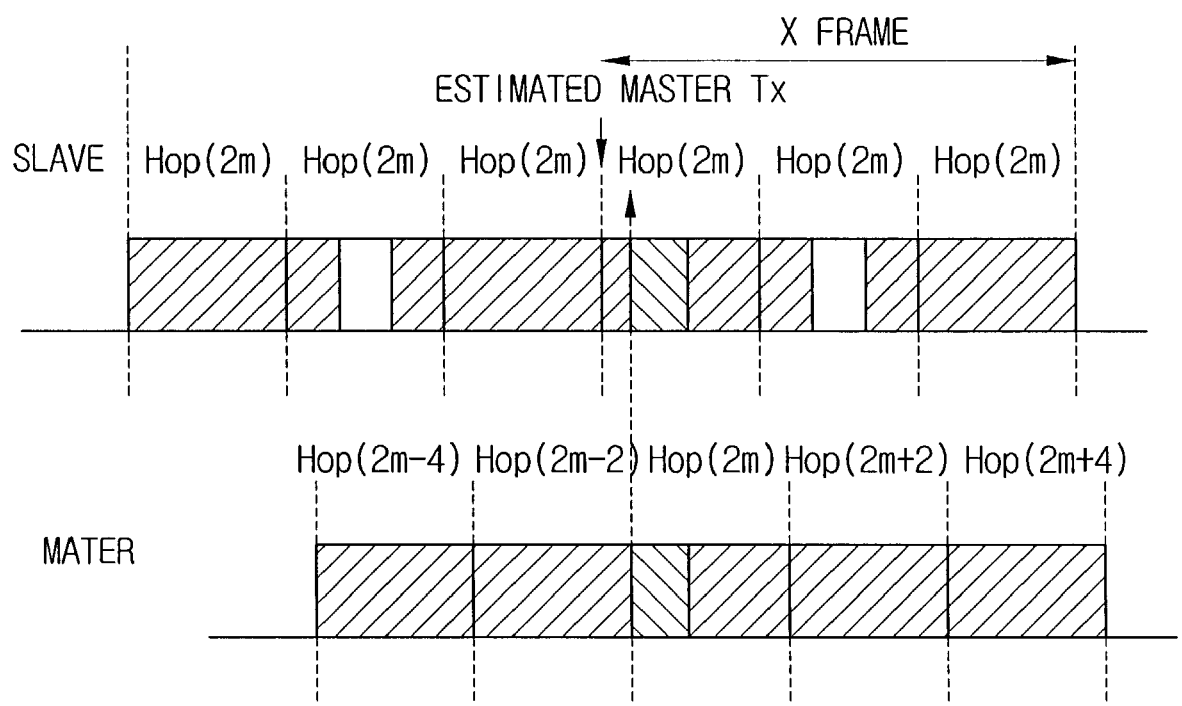
FIG. 9 illustrates an example of offset compensated between a master and a slave of FIG. 8.

FIG. 8 illustrates a window size enlarged in a frame unit of FIG. 6, and FIG. 9 illustrates an example of offset compensated between the master and the slave of FIG. 8.

Referring to FIGS. 8 and 9, predetermined frames are obtained by calculating Hop 2 m based on the hold mode or the sniff mode. The transceiver 21(31) of the wireless communication apparatus 20(30) transmits and receives data packets to and from the external equipment. The data packets refer to a unit of data transmitted through the piconet channel. Each data packet includes three elements, an access code, a header, and a payload. The access code and the header have a fixed size, generally 72 bits and 54 bits. The payload may have a size between 0 and 2745 bits. There are various types of packet, such as an access code type packet, an access code and header type packet, an access code and payload type packet, and so on.

The packet starts with the access code. If the header follows after the access code, the access code has a length of 72 bits. If no header follows, the access code has a length of 68 bits. The access code is used for signal synchronization, DC offset compensation, and signal identification. The access code can identify all the packets transmitted and received on the piconet channel.

The frequency matched unit 23(33) compensates latency for the clock value of the frames to be transmitted and received, if the wireless communication apparatus 20(30) is transited from any one of the hold mode, the sniff mode, and the park mode to a normal mode, i.e., an access mode. A method for compensating offset of the latency will be described with reference to FIG. 10.

Figure 10:
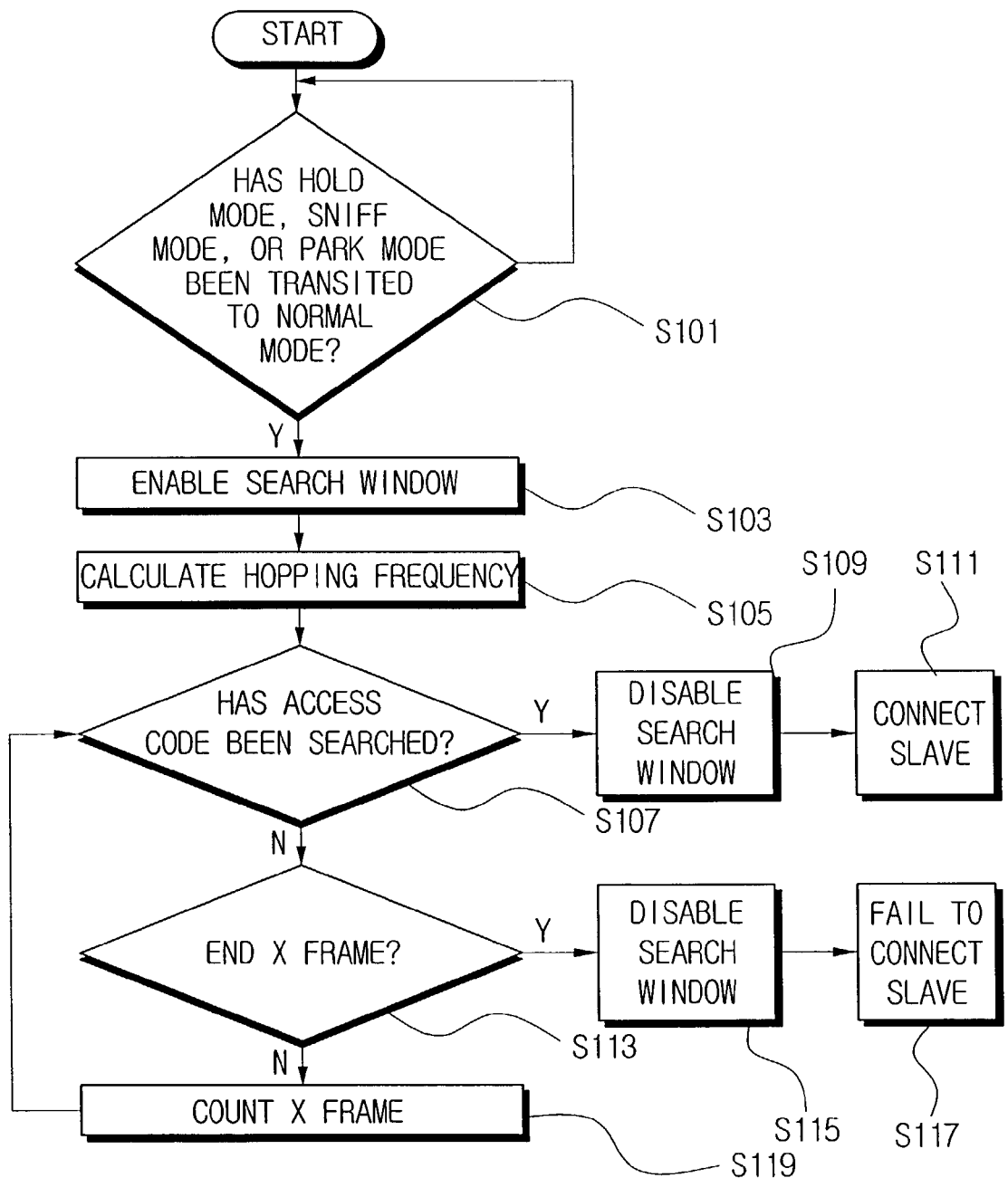
FIG. 10 is a flow chart illustrating a method for compensating offset in the wireless communication apparatus of FIG. 6.

FIG. 10 is a flow chart illustrating a method for compensating offset in the wireless communication apparatus of FIG. 6.

Referring to FIG. 10, the transceiver 21(31) of the wireless communication apparatus 20(30) transmits and receives data packets to and from the external equipment. The frequency matched unit 23(33) of the wireless communication apparatus 20(30) determines whether the wireless communication apparatus 20(30) has been transited from any one of the hold mode, the sniff mode, and the park mode to the normal mode (S101). If the wireless communication apparatus 20(30) has been transited from any one of the hold mode, the sniff mode, and the park mode to the normal mode, the frequency matched unit 23(33) enables a search window for the frames to be transmitted and received (S103). The counter 28(38) of the frequency matched unit 23(33) counts the number of the frames to be transmitted and received. The number of the frames to be transmitted and received refers to a frame unit conversion factor of the data packets in a standby state without being transmitted to the external equipment during the hold mode, the sniff mode, or the park mode. The frequency matched unit 23(33) obtains a clock value corresponding to the counted frames. Also, the frequency matched unit 23(33) adds the clock value of the obtained frames to the clock value of the wireless communication apparatus 20(30), i.e., the Bluetooth clock value. The frequency matched unit 23(33) obtains the hopping frequency for the frames to be transmitted and received, from an inverse number value of the value obtained by adding the clock value of the frames to be transmitted and received to the Bluetooth clock value (S105). The frequency matched unit 23(33) hops the frames to be transmitted and received with the calculated hopping frequency. One frame in the frames to be transmitted and received has a length of 1.25 ms which is one frame length in the FHSS system. The FHSS system is one of two representative spread band technologies, and the other is a direct sequence spread spectrum (DSSS) system. The DSSS system modulates the original signal with a greater bandwidth than a data bandwidth and spreads the modulated signal. While the FHSS system moves data from one frequency to another frequency by means of a programmed order or random sequence, and its receiving party should identify movement of the frequency. The FHSS system has an advantage in that it is less susceptible to an interference phenomenon than the DSSS system.

Furthermore, the frequency matched unit 23(33) determines whether the access code has been searched from the frames to be transmitted and received (S107). Once the access code has been searched from the frames to be transmitted and received, the frequency matched unit 23(33) disables the search window (S109), and is connected to the slave or a master of another piconet to transmit and receive data packets (S111).

If the access code has not been searched from the frames to be transmitted and received, the frequency matched unit 23(33) determines whether the frames to be transmitted and received have been ended (S113).

If it is determined that the frames to be transmitted and received have been ended, the frequency matched unit 23(33) determines that the frames do not communicate with the external equipment and that connection of the slave has failed (S117).

If it is determined that the frames to be transmitted and received have been ended, the frequency matched unit 23(33) counts the frames to be transmitted and received, so that the above method is repeatedly implemented for the next frame. Thus, offset generated in the frames to be transmitted and received can efficiently be compensated if the wireless communication apparatus is transited from the hold mode, the sniff mode, or the park mode to the normal mode. In the wireless communication apparatus according to the present invention, since the window size of a microsecond unit is enlarged in a frame unit, the latency can be compensated more efficiently.

What is claimed is:

1. A wireless communication apparatus comprising:
    a transceiver for transmitting and receiving data packets to and from an external equipment; and
    a frequency matched unit for compensating an offset due to latency that may occur during communication between the wireless communication apparatus and the external equipment by adding a clock value corresponding to predetermined frames to a clock value of a system clock if any one of a hold mode, a sniff mode, or a park mode is transited to a normal mode.

2. The wireless communication apparatus according to claim 1, wherein the frequency matched unit includes:
    a hopping frequency calculator for calculating a hopping frequency of the frames from the added value; and
    a controller for compensating a frequency of the frames to the hopping frequency so that the offset is compensated.

3. The wireless communication apparatus according to claim 2, wherein the frequency matched unit further includes an access code searcher for detecting an access code provided in the data packets, and the controller compensates the offset if the access code is detected.

4. The wireless communication apparatus according to claim 3, wherein the frequency matched unit further includes a counter for counting the number of the frames, and the clock value corresponding to the frames is obtained from the number of the frames counted by the counter.

5. The wireless communication apparatus according to claim 4, wherein the controller determines whether the frames have been ended if the access code is not detected, counts the frames if it is determined that the frames have not been ended, and controls the counter and the access code searcher to detect the access code.

6. The wireless communication apparatus according to claim 4, wherein one frame of the frames has a frame length of a FHSS system.

7. A wireless communicating method comprising the steps of:
    transmitting and receiving data packets to and from an external equipment; and
    compensating offset due to latency that may occur during communication between a wireless communication apparatus and the external equipment by adding a clock value corresponding to predetermined frames to a clock value of a system clock if any one of a hold mode, a sniff mode, or a park mode is transited to a normal mode.

8. The method according to claim 7, wherein the compensating step comprising the steps of:
    calculating a hopping frequency of the frames from the added value; and
    compensating a frequency of the frames to the hopping frequency so that the offset is compensated.

9. The wireless communicating method according to claim 7, wherein the compensating step further includes the step of searching an access code provided in the data packets, and is implemented to compensate the offset if the access code is detected.

10. The method according to claim 9, wherein the compensating step further includes the steps of:
    counting the number of the frames; and
    calculating the clock value corresponding to the frames from the number of the frames counted by the counting step.

11. The method according to claim 10, further comprising the steps of:
    determining whether the frames have been ended if the access code is not detected; and
    counting the frames if it is determined that the frames have not been ended to search the access code.

12. The method according to claim 10, wherein one frame in the frames has a frame length of a FHSS system.

* * * * *